US007000528B2

(12) United States Patent
Home

(10) Patent No.: US 7,000,528 B2
(45) Date of Patent: Feb. 21, 2006

(54) BARBECUING PUSH CART

(75) Inventor: William Home, Taipei (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/865,799

(22) Filed: Jun. 14, 2004

(65) Prior Publication Data

US 2005/0274261 A1 Dec. 15, 2005

(51) Int. Cl.
*A47J 37/00* (2006.01)
*A47J 37/06* (2006.01)

(52) U.S. Cl. ........................... 99/339; 99/450; 99/482; 126/25 R

(58) Field of Classification Search .................. 99/339, 99/340, 419–421 V, 444–450, 482, 481; 126/41 R, 126/9 R, 25 R–25 C, 9 B
See application file for complete search history.

(56) References Cited

U.S. PATENT DOCUMENTS 3,386,430 A * 6/1968 Linstead ...................... 99/340
4,213,381 A * 7/1980 Ellis ............................ 99/446
4,572,062 A * 2/1986 Widdowson ................. 99/345
4,854,297 A * 8/1989 Shuman ....................... 99/339
5,452,707 A * 9/1995 Harris et al. .............. 126/41 R
5,934,183 A * 8/1999 Schlosser et al. ............. 99/385
6,205,912 B1 * 3/2001 Chiu .......................... 99/339
6,237,472 B1 * 5/2001 Gates .......................... 99/446
6,397,731 B1 * 6/2002 Gillespie et al. .............. 99/339
6,439,220 B1 * 8/2002 Johnson .................... 126/25 R

* cited by examiner

*Primary Examiner*—Timothy F. Simone
(74) *Attorney, Agent, or Firm*—Leong C. Lei

(57) ABSTRACT

A barbecuing push cart employing LPG and charcoal for barbecuing is disclosed. The barbecuing push cart comprises a hand-pushing cart and a barbecuing oven mounted on the push cart. The opening of the oven has an inner edge wall on which a barbecuing net can be mounted. The internal bottom section of the oven housing is provided with an LPG oven plate. An elevating device having a charcoal plate is provided between the oven opening and the LPG oven plate. One side end of the elevating device is horizontally projected out with a rocking shaft which is projected through the oven and extended toward the user. A downward lifting door is formed at the elevating device and the elevating region of the charcoal plate. An ignition element linked to the LPG stove plate is protruded out from the oven and an ignition button is formed. The frame wall of the oven housing, corresponding to the rocking shaft, is a multi-stage engaging slots. Thus, the barbecuing oven can be operated using both charcoal and LPG.

2 Claims, 4 Drawing Sheets

BARBECUING PUSH CART

BACKGROUND OF THE INVENTION (a) Technical Field of the Invention

The present invention relates to a push cart for barbecuing, and in particular, a barbecuing push cart which utilizes charcoal as well as LPG A charcoal plate which is adjustable in height is provided with the push cart.

(b) Description of the Prior Art

A conventional barbecue stove or push cart for barbecues generally has only one stove plate, which is either a charcoal plate or a LPG stove plate, and there is no choice with respect to the type of burning material. If an LPG stove is used, it has the advantage of quick ignition and burning but it cannot change to burning using charcoal to provide delicious barbecuing for certain food such as eels. Barbecuing using charcoal as the burning material can provide a unique fragrance to food but the disadvantage is that the ignition is slow. Also, the conventional barbecue grille has a fixed charcoal plate, so if a different height of the burning charcoal is needed for barbecuing, the barbecuing net for placing barbecuing material has to be changed, and this may cause the food to fall accidentally. Further, changing the height of the net holding the barbecuing food material is laborious.

Accordingly, it is an object of the present invention to provide a barbecuing push cart which uses both charcoal and LPG as burning materials.

SUMMARY OF THE INVENTION

Accordingly, it is an object of the present invention to provide a barbecuing push cart having a hand-pushing cart and a barbecuing oven and the inner edge wall of the opening of the barbecuing oven provided with a barbecuing net characterized in that the bottom section of the housing of the barbecuing oven is an LPG stove plate and an elevating device having a charcoal plate positioned between the LPG stove plate and the oven opening. One side end of the elevating device is horizontally provided with a rocking shaft which is projected out from the housing of the barbecuing oven, a downward lifting door is formed at the horizontally corresponding elevating device and the elevating region of the charcoal plate.

The LPG stove plate is linked to an ignition element protruded from the oven housing and an ignition button is formed horizontally; the wall of the downward lift door corresponds to the protrusion of the rocking shaft being a multi-stage engaging slot, and the elevating device comprises a frame body, and a horizontal shaft. The shaft body of the horizontal shaft protrudes out a pair of rocking arms, and the end terminal of the shaft is far away from the rocking arm being pivotally connected to the top end of the frame body and the two shaft ends of the horizontal shaft positioned at the two sides of the oven housing are provided with two shaft holes, and one shaft end of the horizontal shaft is vertically mounted with a rocking shaft, and the multi-stage engaging device is provided with a plurality of hook holes at equal intervals for the mounting of the shaft body.

Yet another object of the present invention is to provide a barbecuing push cart, wherein the distance between the charcoal stove/the LPG stove to the barbecuing food is adjusted by using a rocking shaft. This allows the barbecuing food to be grilled at an appropriate heating without the need to change the height of the net placing the barbecuing food above the burning charcoal (or LPG).

Still another object of the present invention is to provide a barbecuing push cart, wherein the barbecuing distance can be adjusted by lowering the rocking shaft. The position of the rocking shaft can be fastened. Thus, the adjusting of the barbecuing distance is simple and convenient.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
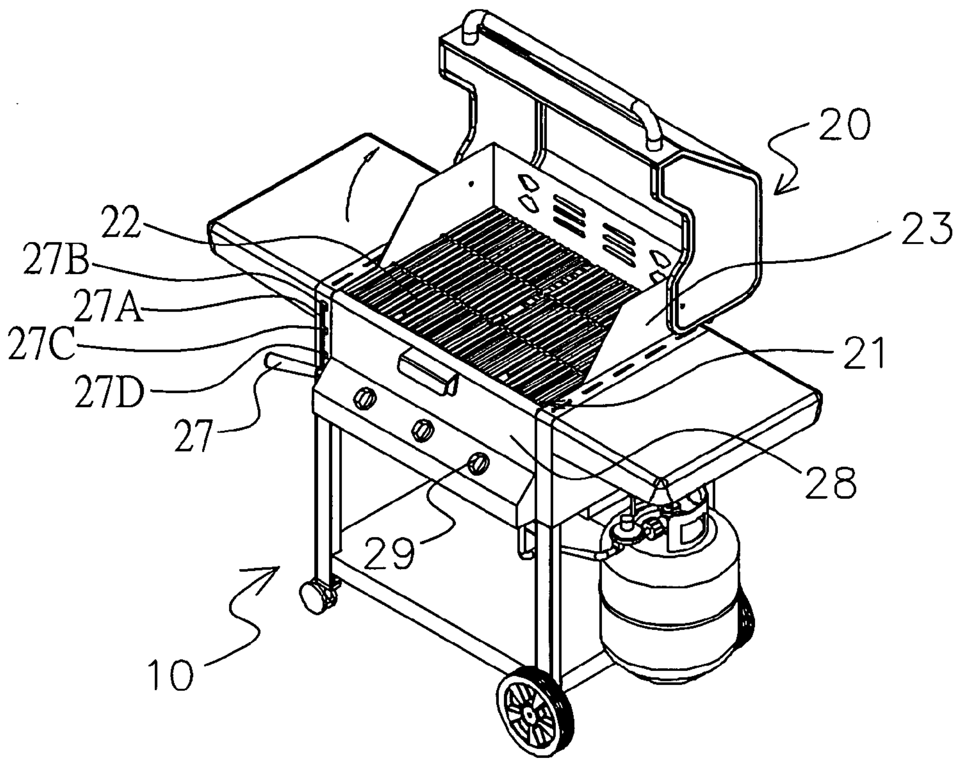
FIG. 1 is a perspective view of the barbecuing push cart of the present invention.
Figure 2:
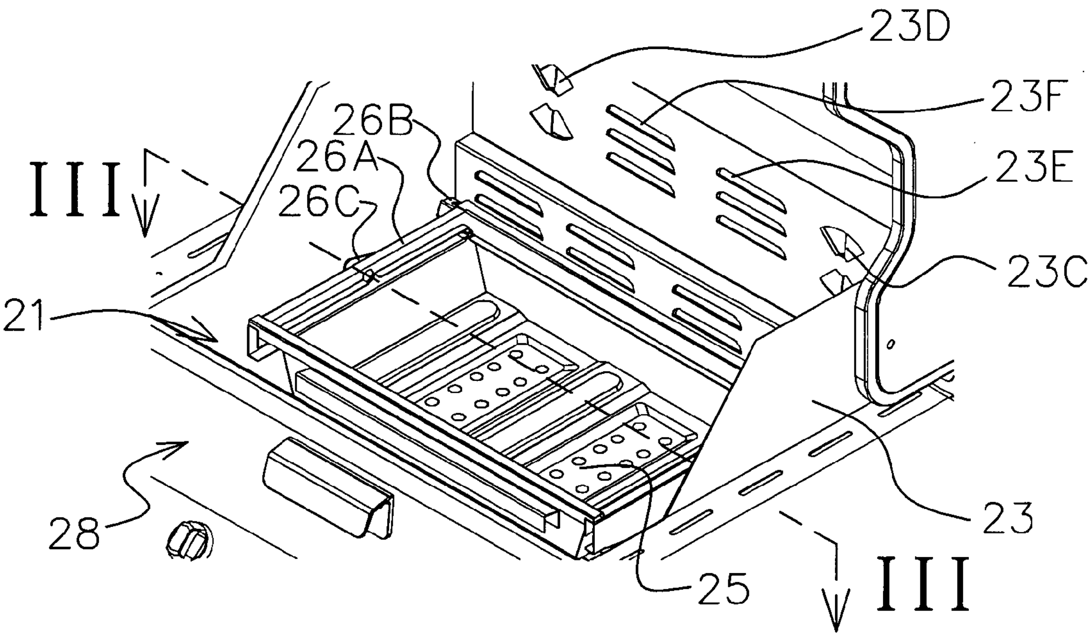
FIG. 2 is a perspective view showing the interior of the barbecuing push cart of the present invention.
Figure 3:
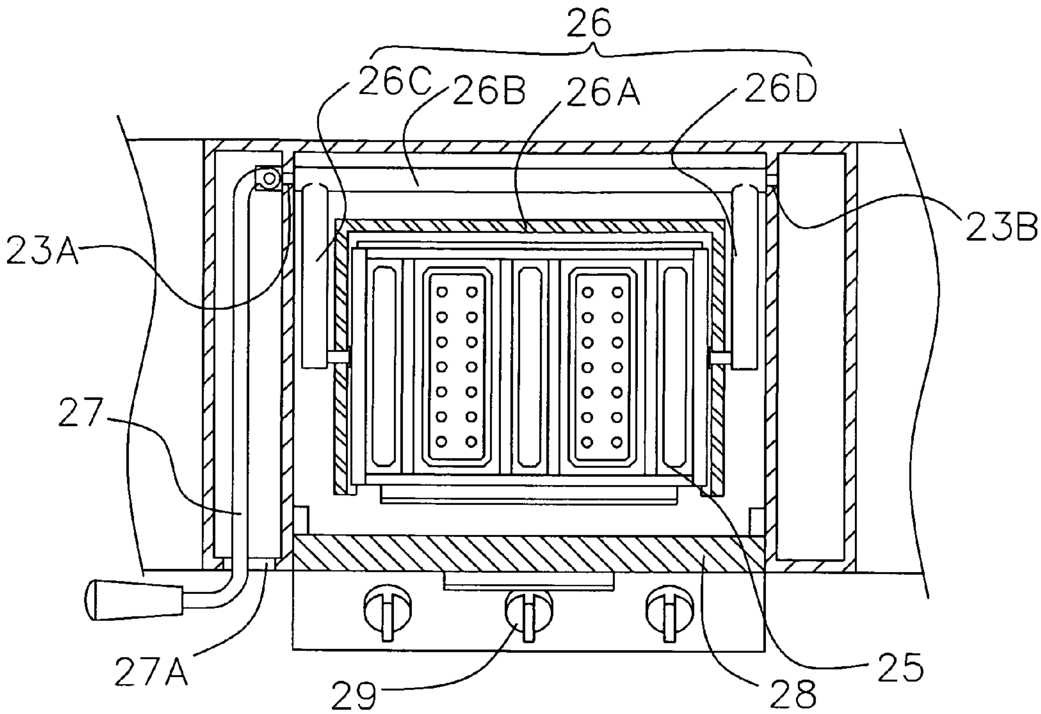
FIG. 3 is a sectional view along line 111—111 of the present invention.

Referring to FIGS. 1 to 3, there is shown a barbecuing push cart in accordance with the present invention. The push chart for barbecuing employing charcoal and LPG as the burning material comprises a hand-pushing cart and a barbecuing oven and the inner edge wall of the opening of the barbecuing oven is provided with a barbecuing net characterized in that the bottom section of the housing of the barbecuing oven is an LPG stove plate and an elevating device having a charcoal plate positioned between the LPG stove plate and the oven opening, one side end of the elevating device being horizontally provided with a rocking shaft which is projected out from the housing of the barbecuing oven, a downward lifting door being formed to the horizontally corresponding elevating device and the elevating region of the charcoal plate, the LPG stove plate linked to an ignition element 291 protruded from the oven housing and an ignition button formed horizontally, the wall of the downward lift door corresponding to the protrusion of the rocking shaft being a multi-stage engaging slot, and the elevating device comprising a frame body, and a horizontal shaft 26B, the shaft body of the horizontal shaft 26B extending out to form a pair of rocking arms 26C and 26D, and the end terminal of the shaft being far away from the rocking arm being pivotally connected to the top end of the frame body and the two shaft ends of the horizontal shaft positioned at the two sides of the oven housing being provided with two shaft holes 23A and 23B, and one shaft end of the horizontal shaft being vertically mounted with a rocking shaft, and the multi-stage engaging device provided with a plurality of hook holes 27B, 27C and 27D at equal interval for the mounting of the shaft body.

Figure 4:
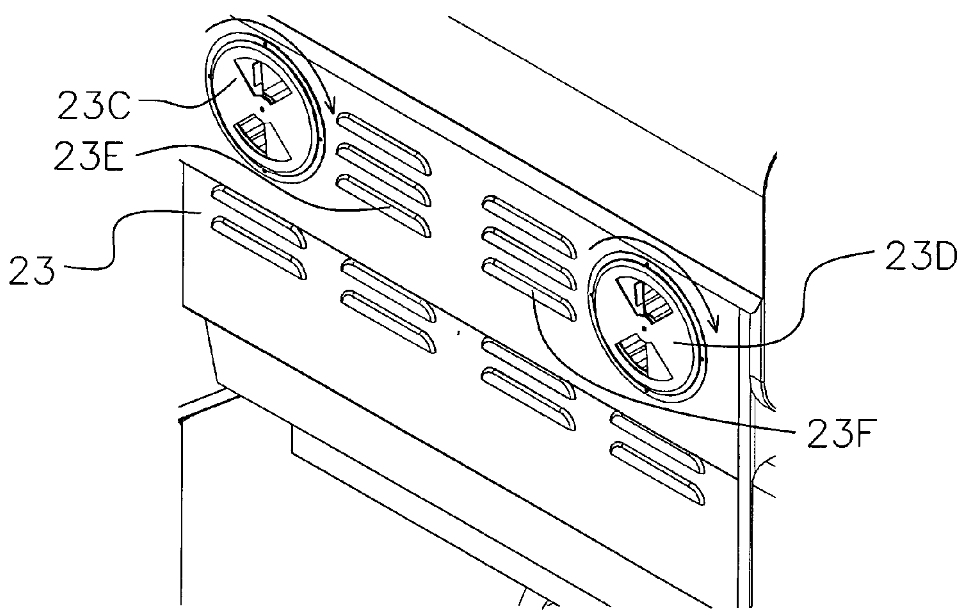
FIG. 4 is a perspective view showing the back of the oven of the barbecuing push cart of the present invention.

As shown in FIG. 4, a plurality of slits 23E and 23F with an air hole grating for the regulation of air flow rate is provided at the back of the oven housing.

As shown in FIG. 4, a plurality of slits with an air hole grating for the regulation of air flow rate is provided at the back of the oven housing.

Figure 5:
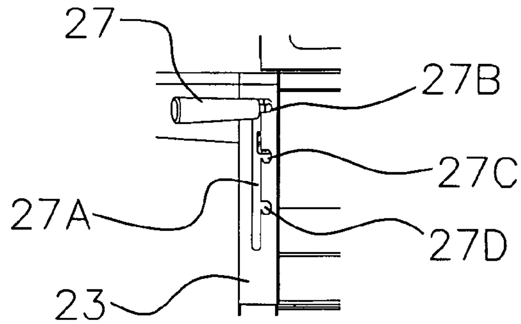
FIG. 5 is a front view showing the multi-stage engaging slot at the highest position in accordance with the present invention.
Figure 6:
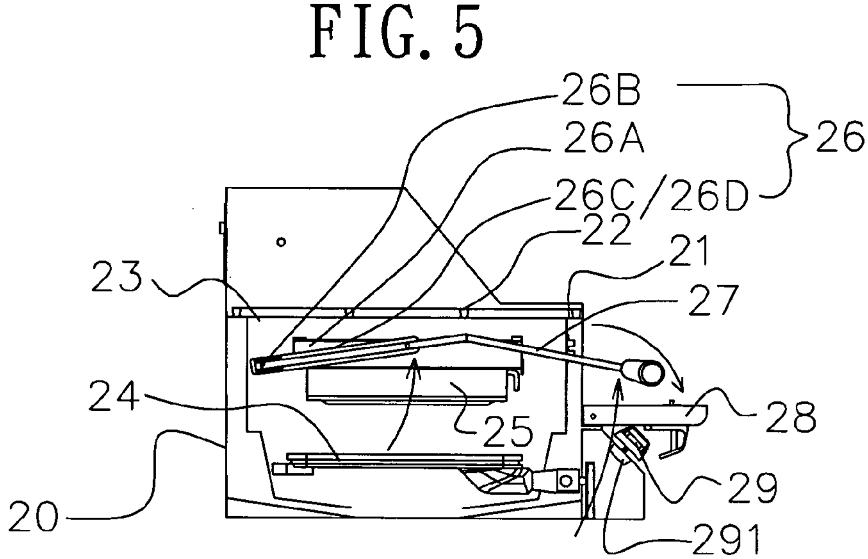
FIG. 6 is a sectional view of the lateral side of the charcoal plate in accordance with the present invention.
Figure 7:
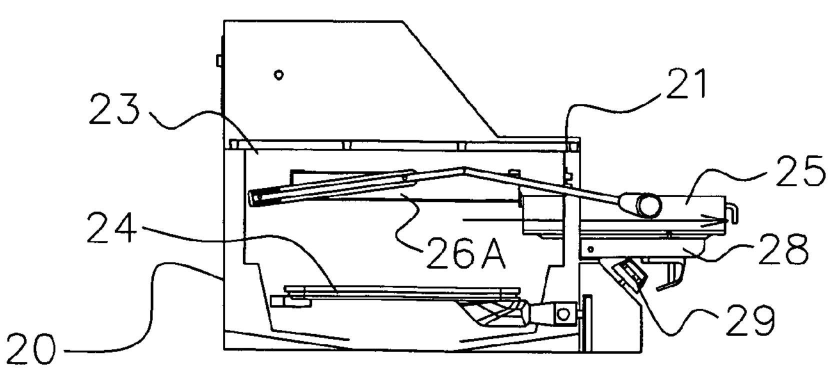
FIG. 7 is a lateral sectional view of the push cart when the charcoal plate is removed from the push cart.
Figure 8:
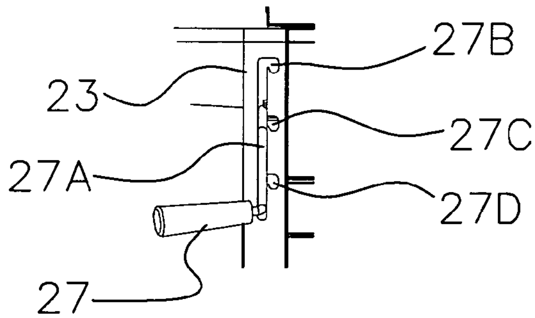
FIG. 8 is a front view showing the multi-stage engaging slot at the lowest position in accordance with the present invention.
Figure 9:
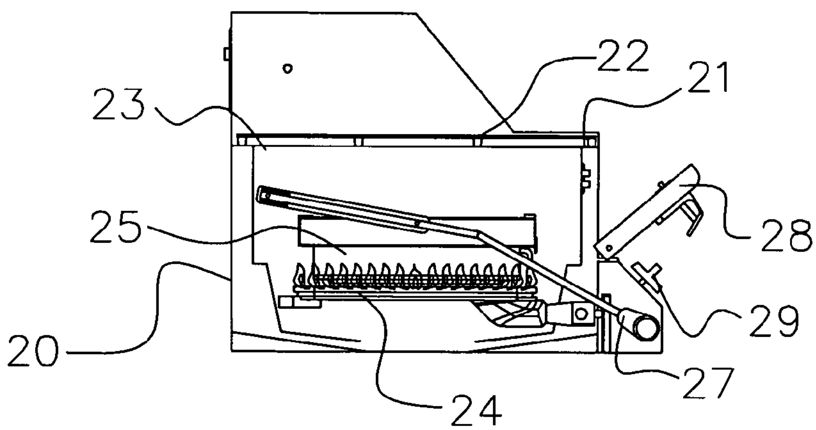
FIG. 9 is a lateral side view of the charcoal plate for low placing of charcoal in accordance with the present invention.
Figure 10:
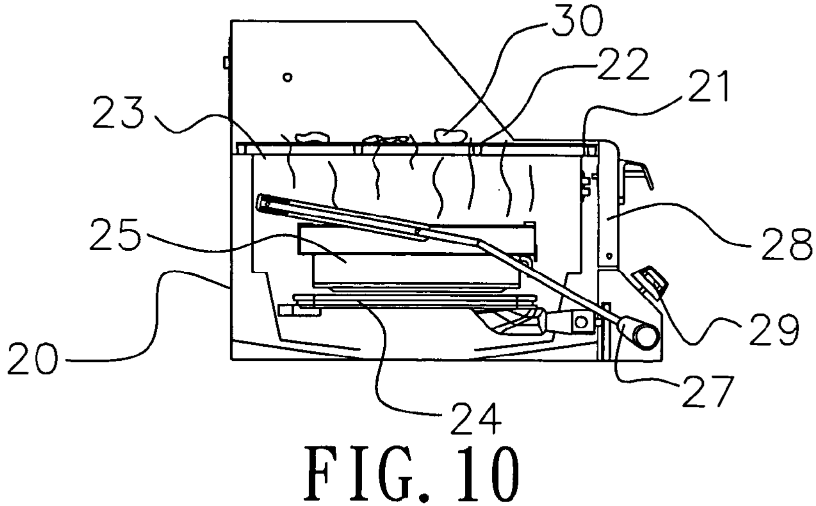
FIG. 10 is a lateral sectional view showing the charcoal in the course of barbecuing in accordance with the present invention.

In accordance with the present invention, when charcoal is used for barbecuing, the downward lift door 28 is opened, and the rocking shaft 27 is pulled along the multi-stage engaging slot 27A so that the shaft 27 is positioned at the highest hook hole 27B for fastening. As shown in FIG. 5, within the housing 23, shown in FIG. 6, the shaft 27 is interlinked with the rocking arms 26C, 26D and the charcoal plate 26 is at the highest position. The entire view of the plate 25 can be seen through the opening of the downward lift door 28. As shown in FIG. 7, the charcoal plate 25 is withdrawn horizontally from the frame body 26A. Charcoal is placed onto the frame body 26A and the charcoal plate 25 is returned back to the frame body 26A. As shown in FIG. 8, the rocking shaft 27 is laterally moved away from the hook hole 27B along the slot 27A to the lowest position of the slot 27A. As shown in FIG. 9, the charcoal plate 25 is moved close to the LPG stove plate 24 and the LPG stove is ignited with the ignition button 29 to ignite the charcoal on the plate 25. The barbecuing net 22 is placed horizontally onto the opening 21 of the oven and after the charcoal is ignited, as shown in FIG. 10, the ignition button 29 is immediately turned off. When the downward lift door 28 is closed, the charcoal is fully used to grille the food on the net 22.

If LPG is used for barbecuing, as shown in FIG. 7, the charcoal plate 25 is horizontally moved away from the frame body 26A for cleaning or a clean charcoal plate is replaced without charcoal. The plate 25 is then returned to the frame body 26A. As shown in FIGS. 7 and 8, the rocking shaft 27 is lowered and the ignition button 29 is ignited to heat the charcoal plate 25. The barbecuing net 22 is removed from the opening 21 of the oven and the barbecuing food is placed onto the charcoal plate 25. Thus, the food is directly grilled using LPG as the heating medium. If charcoal is to be used or the barbecuing distance between the LPG stove to the food is to be changed, the rocking shaft 27 is moved up and down so that the rocking shaft 27 is moved to engage at the lowest or highest position for engagement at the slot 27A. This will interlink with the elevating device 26 to elevate or lower the charcoal plate 25. In accordance with the present invention, the adjustment during barbecuing does not need the use of the hands to hold the barbecuing net or the charcoal plate 25 and therefore the barbecuing process will not be interrupted in the course of changing the barbecuing distance. Further, the barbecuing food will not be accidentally dropped or polluted. In addition, the air hole grating 23C, 23D can adjust the air flow rate which will adjust the smoking heat or heated air.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

The invention claimed is:

1. A barbecuing push cart having a hand-pushing cart and a barbecuing oven and an inner edge wall of an opening of the barbecuing oven provided with a barbecuing net characterized in that the bottom section of a housing of the barbecuing oven is an LPG stove plate and an elevating device having a charcoal plate is positioned between the LPG stove plate and the oven opening, one side end of the elevating device being horizontally provided with a rocking shaft which is projected out from the housing of the barbecuing oven, a downward lifting door being formed to the horizontally corresponding elevating device and the elevating region of the charcoal plate, the LPG stove plate linked to an ignition element protruded from the oven housing and an ignition button formed horizontally, a wall of the downward lift door corresponding to a protrusion of the rocking shaft being a multi-stage engaging slot, and the elevating device comprising a frame body, and a horizontal shaft, the shaft body of the horizontal shaft protruded out a pair of rocking arms, and an end terminal of the shaft being far away from the rocking arm being pivotally connected to the top end of the frame body and the two shaft ends of the horizontal shaft positioned at the two sides of the oven housing being provided with two shaft holes and one shaft end of the horizontal shaft being vertically mounted with a rocking shaft, and a multi-stage engaging device provided with a plurality of hook holes at equal interval for the mounting of the shaft body.

2. The barbecuing push cart of claim 1, wherein a plurality of slits with an air hole grating for the regulation of air flow rate are provided at the back of the oven housing.

* * * * *